United States Patent
Budagavi et al.

(10) Patent No.: US 10,404,960 B2
(45) Date of Patent: Sep. 3, 2019

(54) SYSTEM AND METHOD TO PREVENT BOUNDARY ARTIFACTS

(71) Applicant: Samsung Electronics Co., Ltd., Suwon-si, Gyeonggi-do (KR)

(72) Inventors: Madhukar Budagavi, Plano, TX (US); Youngkwon Lim, Allen, TX (US); Hossein Najaf-Zadeh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/722,828

(22) Filed: Oct. 2, 2017

(65) Prior Publication Data

US 2018/0103242 A1    Apr. 12, 2018

Related U.S. Application Data

(60) Provisional application No. 62/406,068, filed on Oct. 10, 2016.

(51) Int. Cl.
| | |
|---|---|
| *H04N 9/74* | (2006.01) |
| *H04N 13/106* | (2018.01) |
| *H04N 13/178* | (2018.01) |
| *H04N 21/218* | (2011.01) |
| *H04N 21/234* | (2011.01) |
| *H04N 21/235* | (2011.01) |
| *H04N 21/435* | (2011.01) |
| *H04N 21/44* | (2011.01) |
| *H04N 21/81* | (2011.01) |

(52) U.S. Cl.
CPC ......... *H04N 13/106* (2018.05); *H04N 13/178* (2018.05); *H04N 21/2353* (2013.01); *H04N 21/23418* (2013.01); *H04N 21/435* (2013.01); *H04N 21/44008* (2013.01); *H04N 21/816* (2013.01); *H04N 9/74* (2013.01)

(58) Field of Classification Search
USPC .............................................. 386/280; 348/43
See application file for complete search history.

(56) References Cited

U.S. PATENT DOCUMENTS

| | | | |
|---|---|---|---|
| 2006/0034374 A1 | 2/2006 | Park et al. | |
| 2013/0044108 A1 | 2/2013 | Tanaka et al. | |
| 2016/0088287 A1* | 3/2016 | Sadi | H04N 13/254 |
| | | | 348/43 |
| 2016/0188992 A1 | 6/2016 | Hiraga et al. | |
| 2016/0295108 A1 | 10/2016 | Cao | |
| 2017/0339391 A1* | 11/2017 | Zhou | H04L 65/604 |
| 2018/0063505 A1* | 3/2018 | Lee | H04N 13/106 |

OTHER PUBLICATIONS

International Search Report and Written Opinion for International Application No. PCT/KR2017/011123, dated Jan. 16, 2018. (11 pages).

\* cited by examiner

*Primary Examiner* — Thai Q Tran
*Assistant Examiner* — Syed Y Hasan

(57) ABSTRACT

A user equipment (UE) for processing 360° video includes a memory and a processor. The memory receives video data and metadata for processing the video data where the video includes a plurality of regions. The processor determines when the metadata includes an indication that at least one region from the plurality of regions includes a guard margin along at least one boundary of the at least one region. When the indication indicates that the at least one region includes the guard margin, the processor process the video data based on the received metadata.

20 Claims, 6 Drawing Sheets

SYSTEM AND METHOD TO PREVENT BOUNDARY ARTIFACTS

CROSS-REFERENCE TO RELATED APPLICATION AND CLAIM OF PRIORITY

This application claims priority under 35 U.S.C. § 119(e) to U.S. Provisional Patent Application No. 62/406,068 filed on Oct. 10, 2016, the above-identified provisional patent application is hereby incorporated by reference in its entirety.

TECHNICAL FIELD

This disclosure relates generally to 360° video. More specifically, this disclosure relates to preventing boundary artifacts in 360° video.

BACKGROUND

Virtual reality experiences are becoming prominent. For example, 360° video is emerging as a new way of experiencing immersive video due to the ready availability of powerful handheld devices such as smartphones. 360° video enables immersive "real life", "being there" experience for consumers by capturing the 360° degree view of the world. Users can interactively change their viewpoint and dynamically view any part of the captured scene they desire. Display and navigation sensors track head movement in real-time to determine the region of the 360° video that the user wants to view.

In packed projections such as a packed cube map, there may be discontinuity in one or more of the region boundaries in a 360° video which are not at the intersection of adjacent regions. During video rendering, texels from adjacent regions get used in texel interpolation leading to the discontinuity appearing as a boundary artifact in the rendered video.

One solution used to solve this problem is to use a guard margin at the region boundaries. However using the guard margin will lead to additional redundant texels in the transmitted video. Another solution is to extend the texels at the region boundaries. However, this leads to increased complexity at the decoder if texel extension is not supported in the rendering hardware. In order to provide implementation flexibility, a signaling mechanism is then needed to indicate whether guard margin is used at region boundary or whether padding is to be carried out.

SUMMARY

The present disclosure relates to systems and method for preventing boundary artifacts in 360° video.

In a first embodiment, a user equipment (UE) for processing 360° video includes a memory and a processor. The memory receives video data and metadata for processing the video data where the video includes a plurality of regions. The processor determines when the metadata includes an indication that at least one region from the plurality of regions includes a guard margin along at least one boundary of the at least one region. When the indication indicates that the at least one region includes the guard margin, the processor process the video data based on the received metadata. When the at least one region does not include the guard margin, the processor adds the guard margin before processing the video data.

In a second embodiment, a method for processing 360° video includes receiving video data and metadata for processing the video data where the video includes a plurality of regions. The method also includes determining when the metadata includes an indication that at least one region from the plurality of regions includes a guard margin along at least one boundary of the at least one region. When the indication indicates that the at least one region includes the guard margin, the video data is processed based on the received metadata. When the at least one region does not include the guard margin, the guard margin is added before processing the video data.

In a third embodiment, a server for storing and transmitting 360° video includes a memory and a processor. The memory receives video data where the video includes a plurality of regions. The processor determines whether at least one boundary of at least one region among the plurality of regions needs a guard margin and applies the guard margin to the at least one boundary. The processor also adds an indicator to metadata corresponding to the video data where the indicator is configured to provide an indication that the at least one boundary includes a guard margin.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged device or system.

Figure 1:
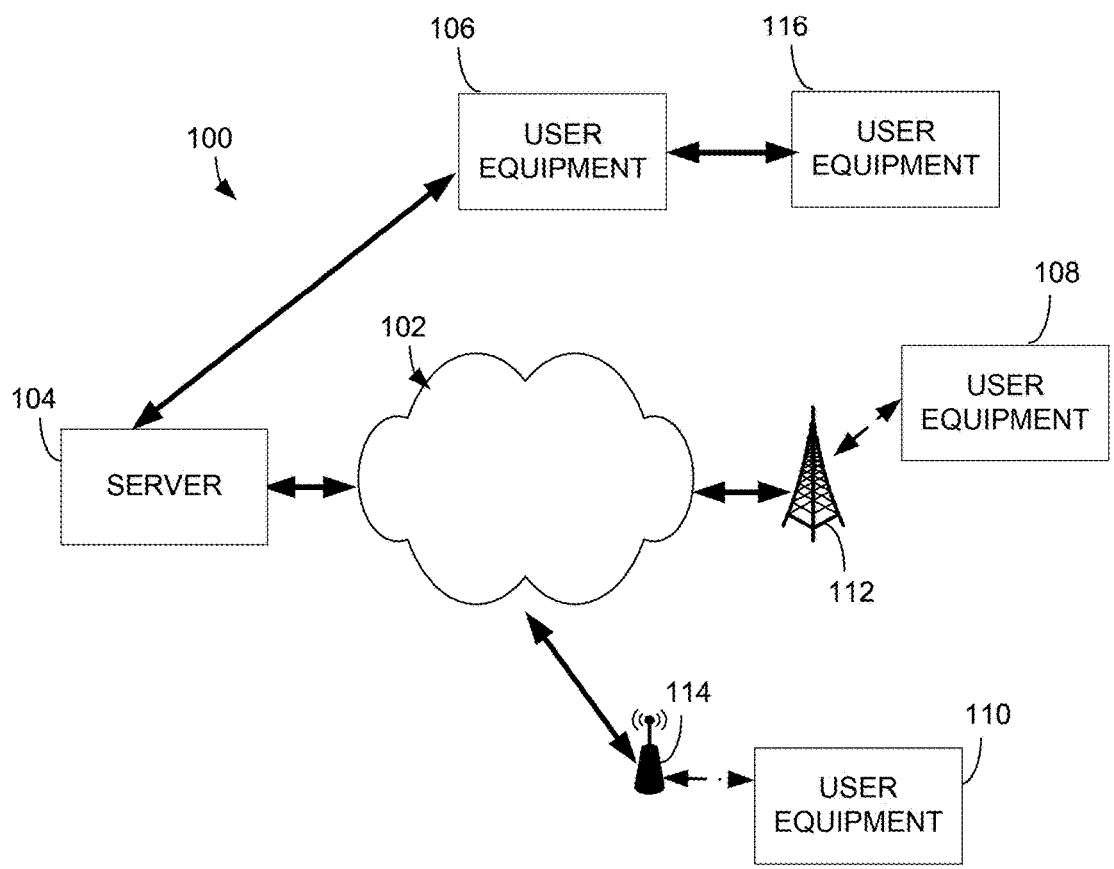
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between the server 104 and various UEs 106-110. The UEs 106-110 may be, for example, a smartphone, tablet, laptop, personal computer, a wearable device, or head-mounted display (HMD). The server 104 includes any suitable computing or processing device that can provide computing services for one or more client devices. Each server 104 could, for example, include one or more processing devices, one or more memories storing instructions and data, and one or more network interfaces facilitating communication over the network 102.

In this example, the UE 106 can communicate directly with the server 104 using WI-FI®, BLUETOOTH®, or any short range communication protocols. Some UEs 108 and 110 communicate indirectly with the network 102. For example, the UE 108 communicates via one or more base stations 112, such as cellular base stations or eNodeBs. Also, the UE 110 communicates via one or more wireless access points 114, such as IEEE 802.11 wireless access points. Note that these are for illustration only and that each client device could communicate directly with the network 102 or indirectly with the network 102 via any suitable intermediate device(s) or network(s).

As described in more detail below, the server 104 transmits 360° video with metadata to one or more users. The metadata may provide an indication whether a guard margin is used at a region boundary in order to properly render the 360° video.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
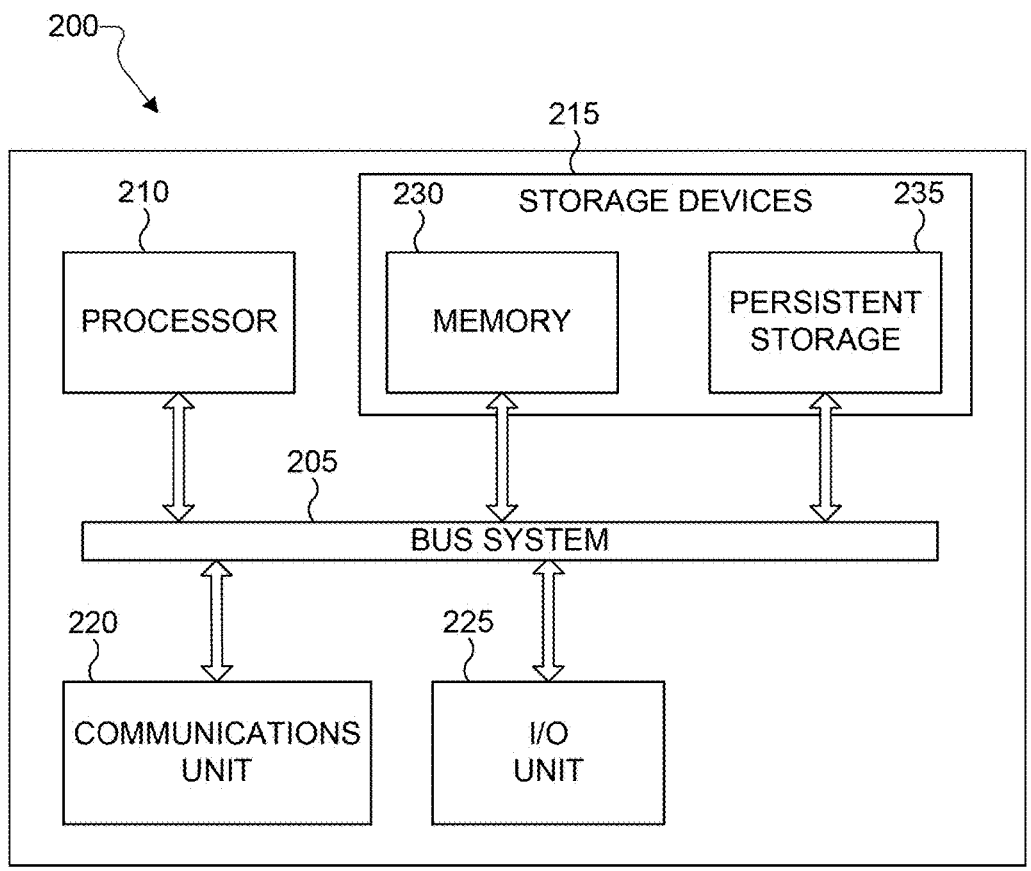
FIG. 2 illustrates an example server in a computing system according to this disclosure.
Figure 3:
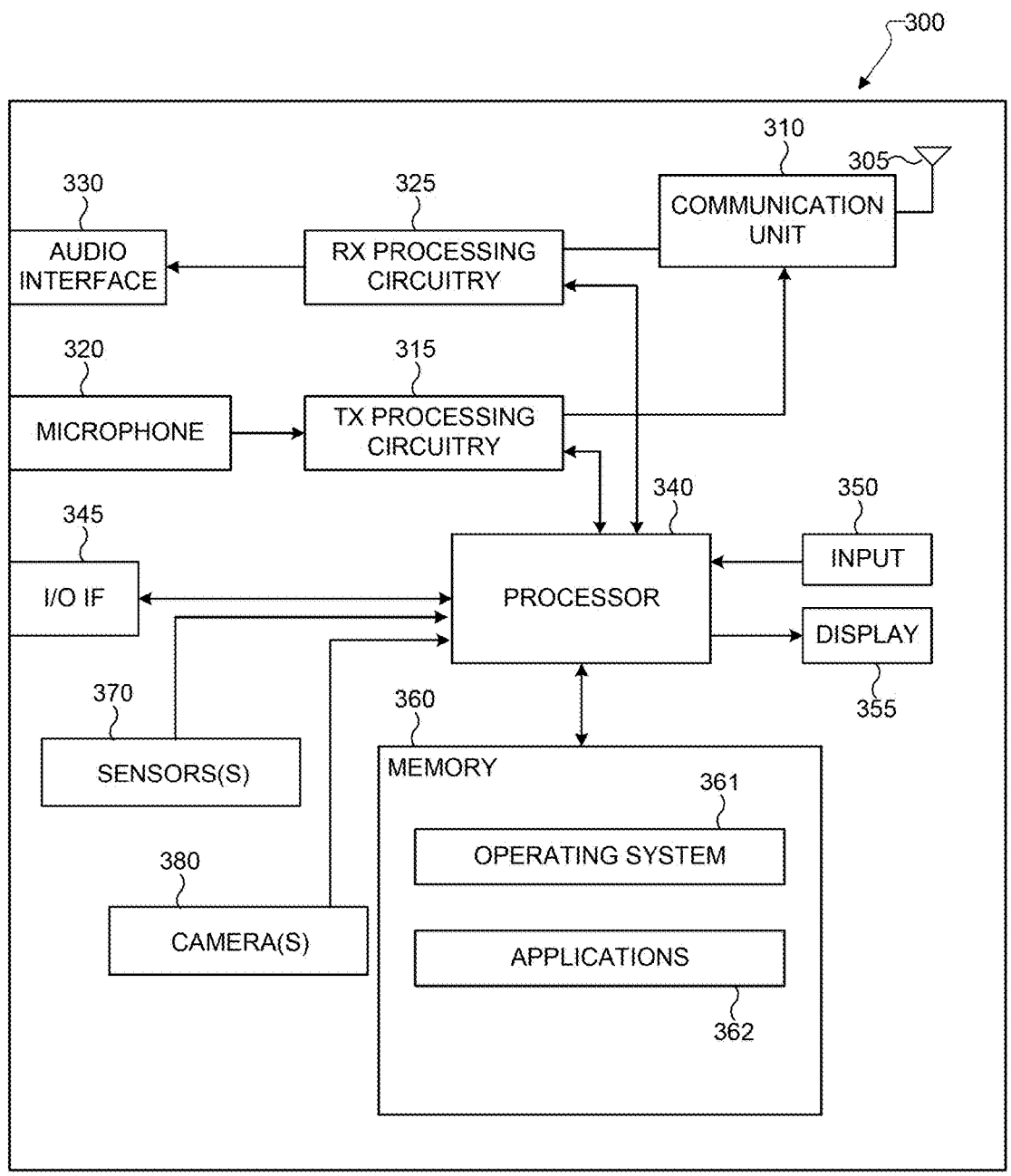
FIG. 3 illustrates an example user equipment (UE) according to this disclosure.

FIGS. 2 and 3 illustrate example devices in a computing system according to this disclosure. In particular, FIG. 2 illustrates an example server 200, and FIG. 3 illustrates an example UE 300. The server 200 could represent the server 104 in FIG. 1, and the UE 300 could represent the UEs 106-110 in FIG. 1.

As shown in FIG. 2, the server 200 includes a bus system 205, which supports communication between at least one processor 210, at least one storage device 215, and at least one communications unit 220.

The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc. Memory 230 stores an application thereon that is used to control one or more functions of the server 200.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

In some embodiments, the server 200 may include an I/O unit 225 that allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example of a server 200, various changes may be made to FIG. 2. For example, the server 200 could include any number of each component shown in FIG. 2. As will be discussed below, server 200 may analyze 360° video and apply a guard margin based on the characteristics of the 360° video.

FIG. 3 illustrates an example UE 300 according to this disclosure. The embodiment of the UE 300 illustrated in FIG. 3 is for illustration only, and the UEs 106-110 of FIG. 1 could have the same or similar configuration. However, UEs come in a wide variety of configurations, and FIG. 3 does not limit the scope of this disclosure to any particular implementation of an UE.

As shown in FIG. 3, the UE 300 includes a communication unit 310. The communication unit 310 may include, for example, a RF transceiver, a Bluetooth transceiver, or a WiFi transceiver. The UE 300 may also include transmit (TX) processing circuitry 315, a microphone 320, and receive (RX) processing circuitry 325. The UE 300 also includes an audio interface or speaker 330, a processor 340, an input/output (I/O) interface (IF) 345, an input 350, a display 355, and a memory 360. The memory 360 includes an operating system (OS) program 361 and one or more applications 362.

The communication unit 310 may receive an incoming RF signal such as, e.g., a BLUETOOTH® signal or a WI-FI® signal. The "communication unit 310" may down convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The communication unit 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the basic OS program 361 stored in the memory 360 in order to control the overall operation of the UE 300. For example, the processor 340 could control the reception of forward channel signals and the transmission of reverse channel signals by the communication unit 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 300 with the ability to connect to other devices such as laptop computers and handheld computers. The I/O interface 345 is the communication path between these accessories and the processor 340.

The processor 340 is also coupled to the input 350 and the display 355. The operator of the UE 300 can use the input 350 (e.g., keypad, touchscreen, button etc.) to enter data into the UE 300. The display 355 may be a liquid crystal display, a light-emitting diode (LED) display, an optical LED (OLED), an active matrix OLED (AMOLED), a transparent or opaque display such one or more lenses on a pair of augmented reality glasses where one or more images maybe projected onto or displayed using the lens, or other display capable of rendering text and/or at least limited graphics, such as from web sites. In one embodiment, the input 350 is a touchscreen. The touchscreen could include a touch panel, a (digital) pen sensor, a key, or an ultrasonic input device. The touchscreen could recognize, for example, a touch input in at least one scheme among a capacitive scheme, a pressure sensitive scheme, an infrared scheme, or an ultrasonic scheme. The touchscreen could also include a control circuit. In the capacitive scheme, the touchscreen could recognize touch or proximity.

The memory 360 is coupled to the processor 340. Part of the memory 360 could include a random access memory (RAM), and another part of the memory 360 could include a Flash memory or other read-only memory (ROM).

UE 300 may further include one or more sensor(s) 370 that can meter a physical quantity or detect an activation state of the UE 300 and convert metered or detected information into an electrical signal. For example, sensor(s) 370 may include one or more buttons for touch input, e.g., on the headset or the UE 300, one or more cameras 380, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (e.g., a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 370 can further include a control circuit for controlling at least one of the sensors included therein. As will be discussed in greater detail below, one or more of these sensor(s) 370 may be used to control a UI, detect UI inputs, determine the orientation and facing direction of the user for 3D content display identification, etc. Any of these sensor(s) 370 may be located within the UE 300, within a headset configured to hold the UE 300, or in both the headset and UE 300, for example, in embodiments where the UE 300 includes a headset.

As will be described below, UE 300 may process incoming 360° video based on the metadata. Specifically, if the metadata includes an indication that a guard margin is present, the UE 300 may process the 360° video. If a guard margin is not present, the UE 300 may add a guard margin before processing the 360° video.

Although FIG. 3 illustrates one example of UE 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

Figure 4A:
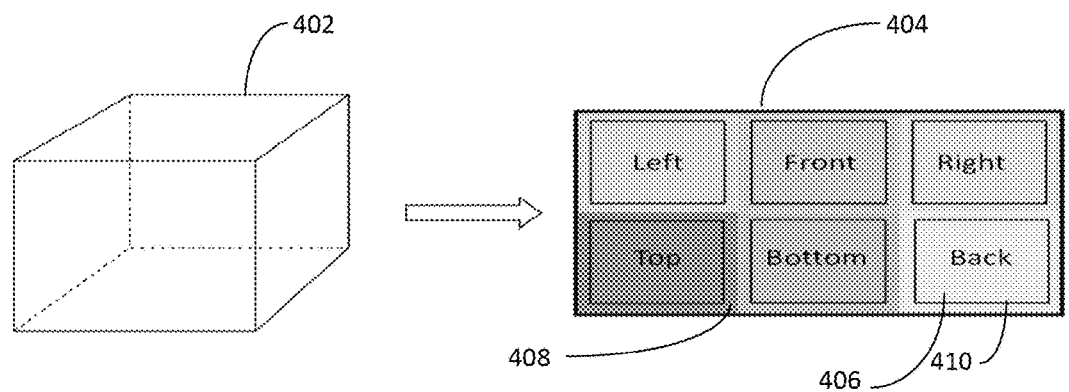
FIGS. 4A and 4B illustrate examples projections of 360° video according to this disclosure.
Figure 4B:
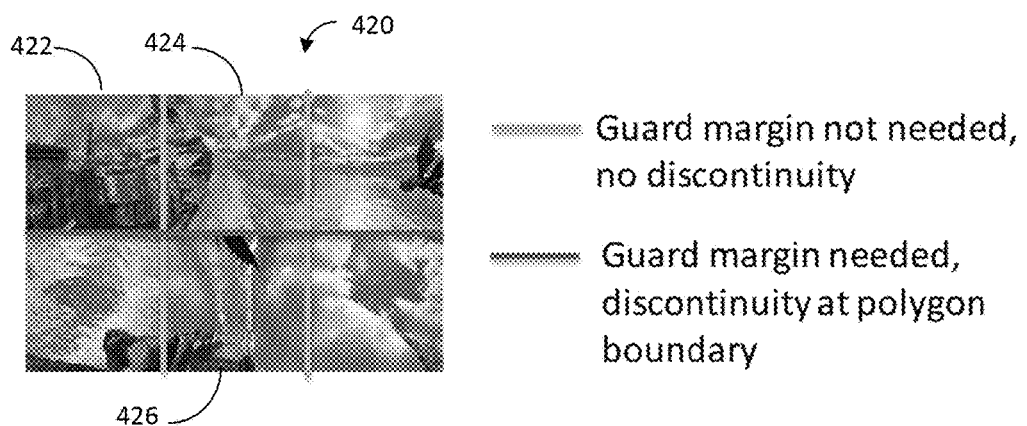

FIGS. 4A and 4B illustrate examples of a packed projection used to transmit 360° video. As shown in FIG. 4A, in the packed projection, the 360° video is mapped onto a cube 402 which is then unfolded into a flat surface 404. Each region area or square 406 is used for rendering each of the six faces of the cube 402. A guard margin 408 is used at the region boundary 410 to extend the region boundary by multiple texels. The guard margin 408 prevents boundary artifacts in rendered video. The height and/or width of the guard margin may be 1% of the region height and/or width for a packed cube. In other embodiments, the guard margin may range from 0 to 10%.

FIG. 4B illustrates a flat surface 420 in accordance with an embodiment of the disclosure. In some embodiments, a guard margin may not be necessary based on the content of the video. For example, where the content is uniform across the boundary or where there is a minimum number of discontinuities across the boundary. In such an embodiment, the guard margin is provided along boundaries where a boundary artifact is more likely to occur. For example, as shown in FIG. 4B, a guard margin is not needed between square 422 and 424 because the content across the boundary is somewhat uniform. However, a boundary is needed between square 424 and 426 because the content is not uniform across the boundary.

In the embodiments described herein, the server, for example server 104 of FIG. 1, transmits 360° video, to a rendering device such as UE 300 of FIG. 3. With the 360° video, the server 104 also transmits metadata associated with the 360° video. The syntax and semantic provided below shows one way of signaling a guard margin related metadata. In the syntax below, the guard margin metadata is indicated for every region. The metadata may also be indicated only once for the whole 3D geometry. It may also be indicated for every region boundary on the 3D geometry.

For the metadata:
Syntax
unsigned int(16) center_pitch_offset;
unsigned int(16) center_yaw_offset;
unsigned int(8) num_of_regions;
for(i=0; i<num_of_regions; i++){
   unsigned int(16) region_id;
   unsigned int(16) region_top_left_x;
   unsigned int(16) region_top_left_y;
   unsigned int(16) region_width;
   unsigned int(16) region_height;
unsigned int(4) guard_margin_flag;
if(guard_margin_flag)
   unsigned int(4) guard_margin;

In the above example syntax for the metadata, center_pitch_offset and center_yaw_offset indicate respectively the offset values of the pitch and yaw angles of the coordinate of the point to which the center texel of the video is rendered. The num_of_regions indicates the number of regions to divide the video in the referenced track. The region_top_left_x and region_top_left_y indicate respectively the horizontal and vertical coordinate of the top-left corner of the partitioned region of the video in the referenced track. The region_width and region_height indicate respectively the width and height of the partitioned region of the video in the referenced track. The guard margin_flag indicates whether guard margin is used in the 360° video or not. If the guard margin_flag=1, then the guard margin is used in the 360° video, else if the guard margin_flag=0, then the image area corresponding to the different regions are extended and input to the renderer in order to prevent boundary artifacts. The guard_margin shall indicate the guard margin in percent used to extend the region boundary in the 360° s video. In some embodiments of the disclosure, a guard_margin of 0 will indicate absence of guard margin. In other embodiments of the invention, the guard margin can be signaled in terms of pixels instead of percent.

In some embodiments, the metadata may indicate a guard margin once per polygon boundary as needed as shown in FIG. 4B. In such an embodiment, the following syntax may be used:
   for(i=0;i<number of polygon boundaries; ++i)
      unsigned int(1) guard_margin_flag;

Guard margins may not be needed when the content across the boundaries is uniform or there are a minimum number of discontinuities across the boundary thereby reducing the amount of data that is transmitted to a rendering device such as UE 300. In other embodiments, the guard margin may vary for each boundary depending the texel values associated with the boundary. In such an embodiment, the following syntax may be used:

```
for(i = 0;i < number of polygon boundaries; ++i) {
    unsigned int(1) guard_margin_flag;
    if(guard_margin_flag)
        unsigned int(4) guard_margin;
}
```

In other embodiments, the guard margin may be signaled once for all polygon boundaries thereby reducing the amount of data transmitted to UE 300.

Figure 5:
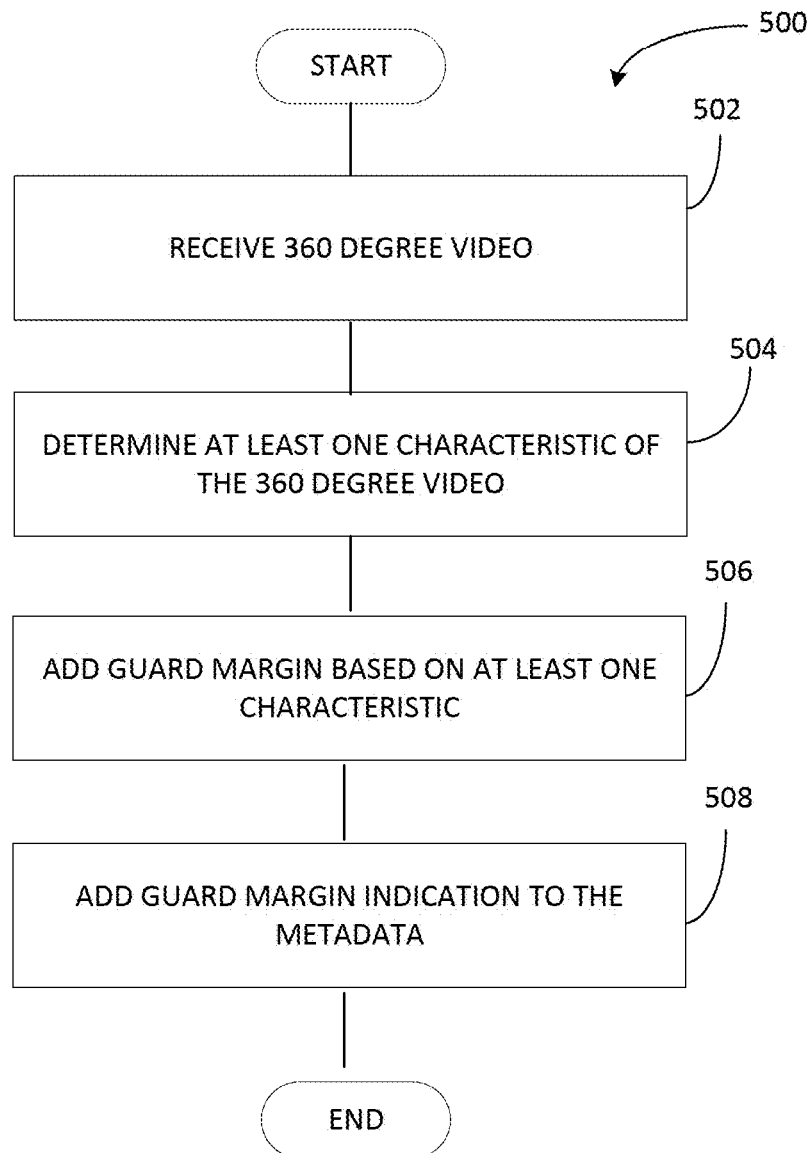
FIG. 5 illustrates a method for preventing boundary artifacts in a server according to this disclosure.

FIG. 5 illustrates a method 500 for generating metadata for a 360° video in a server 200 as shown in FIG. 2. As shown in FIG. 5, 360° video is received by server 200 in operation 502. Processor 201 then analyzes the 360° video to determine at least one characteristic of the 360° video in operation 504. For example, as shown in FIG. 4A, the 360° video is parsed into six regions. In operation 504, the processor 210 may determine that characteristics (e.g., texel value) of each region along each boundary of the regions. Based on the characteristics, the processor 210 may determine whether a guard margin is needed. For example, if the texel values of two regions that share a boundary are uniform or substantially uniform along the boundary, a guard margin may not be necessary. In other embodiments, if there are a minimum number of discontinuities in texel values between two regions that share a boundary along the boundary, a guard margin may be necessary. Uniformity across a boundary can be determined by calculating the variance of the pixels around the boundary. If the variance is below a threshold, then the boundary can be considered to be uniform, else the boundary can be considered to be not uniform. In some embodiments, other metrics such as a first derivative can be used to determine uniformity.

In operation 506, the processor 201 adds a guard margin when processor 210 determines that a guard margin is necessary. The guard margin may be generated by extending the texels in the region across the boundary. In other embodiments, the guard margin may be created by interpolating texels from two regions that share a boundary.

In operation 508, the processor 210 adds a guard margin indicator to the metadata associated with the 360° video. The guard margin indicator may provide a single indication for each boundary in the 360° video. In other embodiments, a guard margin indicator may be provided for each boundary that includes a guard margin.

While the method 500 of FIG. 5 is discussed with regard to server 200, the method 500 may also be executed by a UE 300 of FIG. 3 when 360° video received by UE 300 does not include an indication that a guard margin is present in the 360° video.

Figure 6:
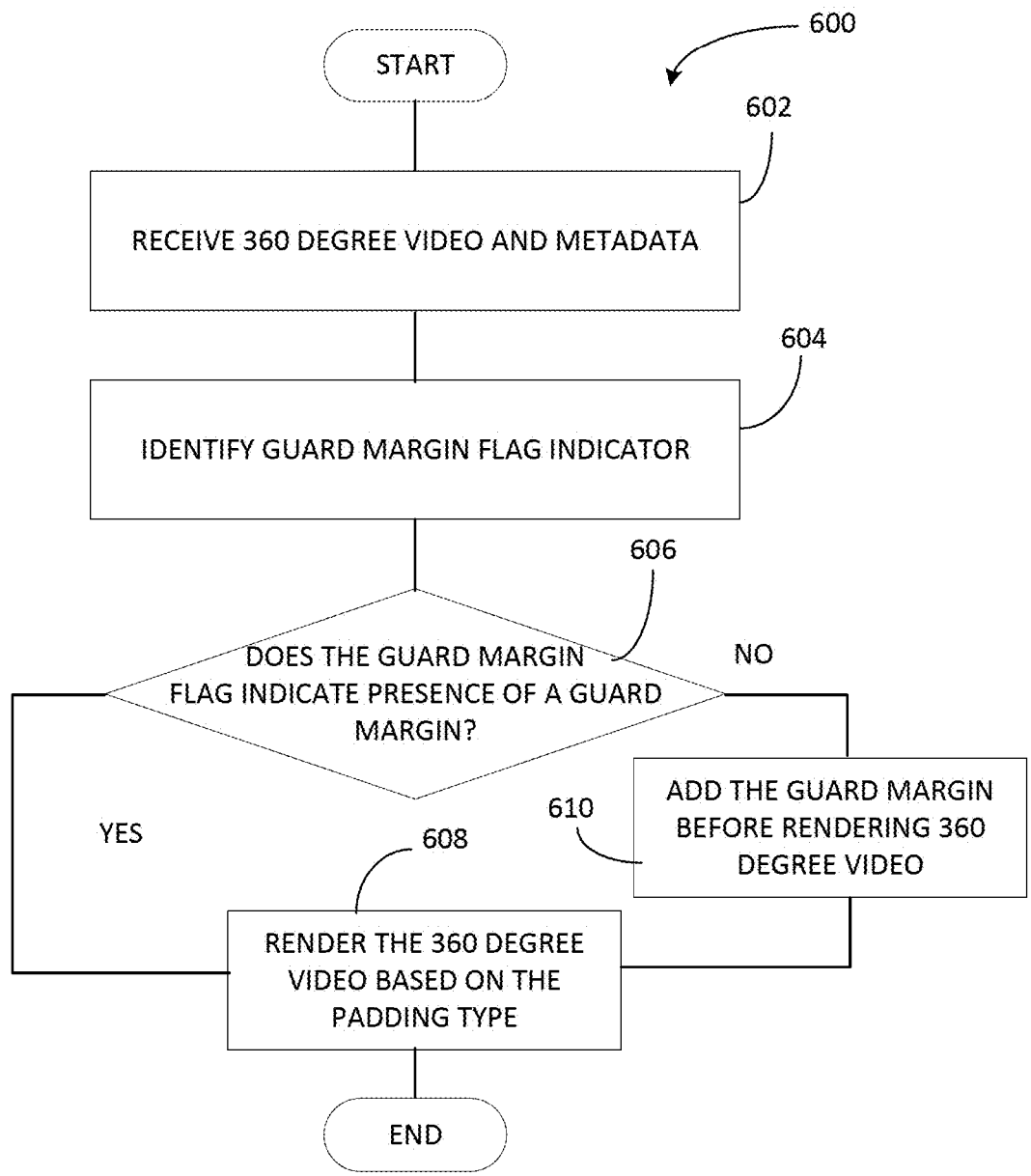
FIG. 6 illustrates a method for preventing boundary artifacts in a UE according to this disclosure.

FIG. 6 illustrates a method 600 for rendering 360° video. As shown in FIG. 6, the method 600 beings in operation 602 where a UE, for example UE 300 of FIG. 3, receives 360° video and metadata corresponding to the 360 video from a server, such as server 200 of FIG. 2.

In operation 604, processor 340 parses the metadata to identify the guard margin flag. In operation 606, the processor determines whether the guard margin flag indicates the presence of a guard margin. If the guard margin flag is present and has a value set to one, the processor 340 determines that the regions included in the 360° video includes a guard margin and proceeds to operation 608. If the value of the guard margin flag is set to "0", the processor 340 determines that a guard margin is not present and proceeds to operation 610.

In operation 608, the processor 340 renders the 360° video based on the padding in the guard margin. Specifically, when rendering the video in the vicinity of the guard margin, the processor 340 renders the 360° video based on whether the padding is created by extending texels in the frame in the guard margin or interpolating texels across the guard margin.

In operation 610, the processor 340 adds a guard margin to one or more regions of the 360° video as shown in FIG. 5 above. The margin may be creating by extending texels from the regions or by interpolating texels across the boundary between regions. Once the guard margin is added by the processor 340, the processor 340 renders the 360° video based on the padding included the guard margin.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) for processing 360° video, the UE comprising:
   a memory configured to receive video data and metadata for processing the video data, the video data includes a plurality of regions; and
   a processor operably connected to the memory, the processor configured to:
      determine when the metadata includes an indication that at least one region from the plurality of regions includes a guard margin along at least one boundary of the at least one region;
      when the indication indicates that the at least one region includes the guard margin, process the video data based on the received metadata; and
      when the indication indicates that the at least one region includes the guard margin, render the video data based on padding in the guard margin.

2. The UE of claim 1, wherein the processor is configured to, when the at least one region does not include the guard margin, add the guard margin before processing the video data.

3. The UE of claim 2, wherein, when the at least one region does not include the guard margin, the processor is configured to add the guard margin by extending texels from the at least one region along the at least one boundary.

4. The UE of claim 2, wherein, when the at least one region does not include the guard margin, the processor is configured to add the guard margin by interpolating texels from the at least one region and another region that share the boundary.

5. The UE of claim 2, wherein, when the at least one region does not include the guard margin, the processor is configured to determine whether a guard margin is necessary based on at least one characteristic of the at least one region along the boundary.

6. The UE of claim 5, wherein the at least one characteristic includes a plurality of texel values along a boundary between the at least one region and another region.

7. The UE of claim 6, wherein, when the plurality of texel values are uniform or substantially uniform, the processor is configured to determine that a guard margin is not needed.

8. The UE of claim 6, wherein, when the plurality of texel values includes a number of discontinuities, the processor is configured to determine that a guard margin is needed.

9. A method for processing 360° video, the method comprising:
   receiving video data and metadata for processing the video data, the video data includes a plurality of regions;
   determining when the metadata includes an indication that at least one region from the plurality of regions includes a guard margin along at least one boundary of the at least one region;
   when the indication indicates that the at least one region includes the guard margin, processing the video data based on the received metadata; and
   when the indication indicates that the at least one region includes the guard margin, rendering the video data based on padding in the guard margin.

10. The method of claim 9, the method further comprising, when the at least one region does not include the guard margin, adding the guard margin before processing the video data.

11. The method of claim 10, wherein, adding the guard margin includes extending texels from the at least one region along the at least one boundary.

12. The method of claim 10, wherein, adding the guard margin includes interpolating texels from the at least one region and another region that share the boundary.

13. The method of claim 10, wherein, when the at least one region does not include the guard margin, the method further comprises determining whether a guard margin is necessary based on at least one characteristic of the at least one region along the boundary.

14. The method of claim 13, wherein the at least one characteristic includes a plurality of texel values along a boundary between the at least one region and another region.

15. The method of claim 14, wherein, when the plurality of texel values is uniform or substantially uniform, the method further comprises determining that a guard margin is not needed.

16. The method of claim 14, wherein, when the plurality of texel values include a number of discontinuities, the method further comprises determining that a guard margin is needed.

17. A server for storing and transmitting 360° video, the server comprising:
a memory configured to receive video data, the video data includes a plurality of regions; and
a processor operably connected to the memory, the processor configured to:
determine whether at least one boundary of at least one region among the plurality of regions needs a guard margin;
applying the guard margin to the at least one boundary; and
adding an indicator to metadata corresponding to the video data, the indicator is configured to provide an indication that the at least one boundary includes a guard margin and provide an indication that the video data is rendered based on padding in the guard margin.

18. The server of claim 17, wherein a plurality of boundaries includes a guard margin and the metadata provides an indication for each boundary among the plurality of boundaries.

19. The server of claim 17 wherein to determine whether the at least one boundary of the at least one region among the plurality of regions needs the guard margin the processor is configured to determine whether the guard margin is necessary based on at least one characteristic of the at least one region along the at least one boundary.

20. The server of claim 19, wherein:
the at least one characteristic includes a plurality of texel values along a boundary between the at least one region and another region,
when the plurality of texel values are uniform or substantially uniform, the processor is configured to determine that a guard margin is not needed, and
when the plurality of texel values includes a number of discontinuities, the processor is configured to determine that a guard margin is needed.

* * * * *